US008805118B2

(12) United States Patent
Wu

(10) Patent No.: US 8,805,118 B2
(45) Date of Patent: Aug. 12, 2014

(54) METHOD FOR AUTOMATIC ALIGNMENT OF RASTER DATA WITH VECTOR DATA IN A GEOGRAPHIC INFORMATION SYSTEM

(75) Inventor: Xiaqing Wu, San Mateo, CA (US)

(73) Assignee: Google Inc., Mountain View, CA (US)

( * ) Notice: Subject to any disclaimer, the term of this patent is extended or adjusted under 35 U.S.C. 154(b) by 84 days.

(21) Appl. No.: 13/426,284

(22) Filed: Mar. 21, 2012

(65) Prior Publication Data

US 2012/0177305 A1 Jul. 12, 2012

Related U.S. Application Data

(60) Division of application No. 12/888,118, filed on Sep. 22, 2010, now Pat. No. 8,160,397, which is a continuation of application No. 11/655,292, filed on Jan. 19, 2007, now Pat. No. 7,869,667.

(51) Int. Cl.
*G06K 9/32* (2006.01)

(52) U.S. Cl.
USPC ............................................ 382/295; 382/113

(58) Field of Classification Search
CPC .......................... G06T 7/0024; G06K 9/00651
USPC .................... 382/295, 154, 113, 294
See application file for complete search history.

(56) References Cited

U.S. PATENT DOCUMENTS

| 5,933,540 | A | 8/1999 | Lakshminarayanan et al. |
| 6,674,445 | B1 | 1/2004 | Chithambaram et al. |
| 7,564,457 | B2 | 7/2009 | Cook et al. |
| 7,660,441 | B2 | 2/2010 | Chen et al. |
| 7,869,667 | B1 | 1/2011 | Wu |
| 8,538,138 | B2 * | 9/2013 | Krishnan et al. ............... 382/154 |
| 2002/0171650 | A1 | 11/2002 | Prabhakaran |
| 2007/0014477 | A1 | 1/2007 | McInnis et al. |
| 2007/0014488 | A1 | 1/2007 | Chen et al. |

OTHER PUBLICATIONS

Bookstein, F.L., "Principal Warps: Thin-Plate Splines and the Decomposition of Deformations", *IEEE Trans. on Pattern Anal. and Mach. Intel*, vol. 11, No. 6, pp. 567-585, Jun. 1989.
Burt, P.J., et al., Local Correlation Measures for Motion Analysis: a Comparative Study. *IEEE Conf. Pattern Recognition Image Processing*, 269-274, Jun. 14-17, 1982.
Chen, C.-C. et al., "Automatically and Accurately Conflating Orthoimagery and Street Maps", *GIS '04: Proceedings of the 12th ACM InternationalSymposium on Advances Geographic Information Systems*, ACM Press, New York, NY, USA, pp. 47-56, Nov. 12-13, 2004.

(Continued)

*Primary Examiner* — Matthew Bella
*Assistant Examiner* — Dennis Rosario
(74) *Attorney, Agent, or Firm* — Dority & Manning, P.A.

(57) ABSTRACT

The present invention relates to methods for aligning raster and vector data.
In an embodiment, a raster/vector aligner receives raster data and an approximate vector of a feature within the raster data. The raster/vector aligner generates an edge signal by edge filtering the raster data along a direction of the approximate vector and a smoothness signal by smoothness filtering the raster data along a direction of the approximate vector. The raster/vector aligner combines the edge signal and the smoothness signal into a combined signal which is used to generate a translation vector or a signal weight for the feature within the raster data.

16 Claims, 17 Drawing Sheets

(56) References Cited

OTHER PUBLICATIONS

Chen, Ching-Chien et al., "Automatically Annotating and Integrating Spatial Datasets", *Department of Computer Science and Information Science Institute*, Los Angeles, CA, USA, 18 pgs, 2003.

Fogel, D.N., et al., "Image Registration using Multiquadric Functions, the Finite Element Method, Bivariate Mapping Polynomials and Thin Plate Spline", Technical Report 96-1, *National Center for Geographic Information and Analysis* (NCGIA), 63 pgs, Mar. 1996.

Gonzalez, Rafael C. et al., "Digital Image Processing: Second Edition," Prentice Hall, Inc., 2002, whole book.

Kybic, Jan, *Elastic Image Registration using Parametric Deformation Models*, 182 pgs, 2001.

Yu, Z., et al., "A Novel Two-steps Strategy for Automatic GIS-Image Registration", *ICIP*, pp. 1711-1714, 2004.

* cited by examiner

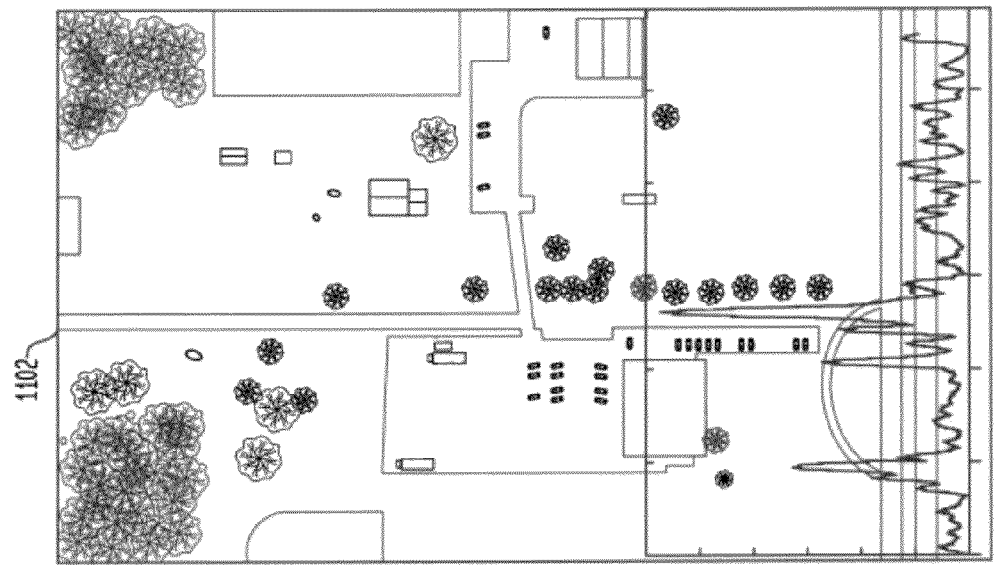
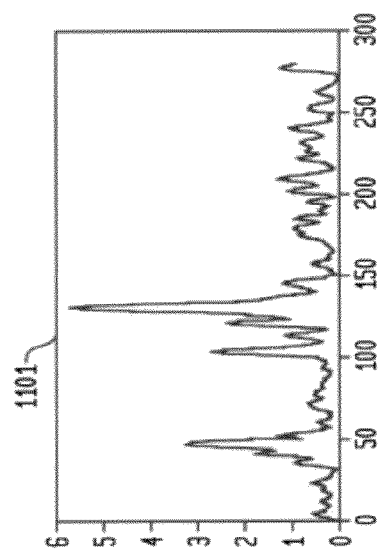
FIG. 11

METHOD FOR AUTOMATIC ALIGNMENT OF RASTER DATA WITH VECTOR DATA IN A GEOGRAPHIC INFORMATION SYSTEM

CROSS-REFERENCE TO RELATED APPLICATIONS

This application is a divisional of U.S. patent application Ser. No. 12/888,118, filed Sep. 22, 2010, now allowed, which is a continuation of U.S. patent application Ser. No. 11/655,292, filed Jan. 19, 2007, now U.S. Pat. No. 7,869,667, both of which are incorporated herein by reference in their entireties.

BACKGROUND OF THE INVENTION

1. Field of the Invention

The present invention relates to computer-aided registration of raster data with vector data.

2. Background Art

A geographic information system (GIS) is a system for archiving, retrieving, and manipulating data that has been stored and indexed according to the geographic coordinates of its elements. A classic problem for geographic information systems is the registration of misaligned vector data and raster data, the vector data typically representing road information and the raster data typically representing aerial imagery. There are a number of causes for the misalignment, including obsolete data, projection errors, inaccurate camera models, the absence of a precise terrain model, different data vendors, etc. Traditionally, the misalignment problem has been addressed by a process called conflation, in which a set of control point pairs is specified and the data is warped in a manner so as to align to the control points. With the rapid development of advanced GIS applications such as Google Earth, however, the amount of data is prohibitive for manual alignment correction processes.

What is needed is a robust and practical method for aligning raster and vector data across varying environments.

BRIEF SUMMARY OF THE INVENTION

The present invention relates to methods for aligning raster and vector data.

In an embodiment, a raster/vector aligner receives raster data and an approximate vector of a feature within the raster data. The raster/vector aligner generates an edge signal by edge filtering the raster data along a direction of the approximate vector and a smoothness signal by smoothness filtering the raster data along a direction of the approximate vector. The raster/vector aligner combines the edge signal and the smoothness signal into a combined signal which is used to generate a translation vector or a signal weight for the feature within the raster data.

In another embodiment, the raster/vector aligner receives raster data and a set of approximate vectors for features within the raster data. The raster/vector aligner identifies directions of the vectors and groups the vectors into directional chunks. The raster/vector aligner defines search areas of the raster data for each directional chunk, each area encompassing at least one vector in the direction. The raster/vector aligner generates translation information for each search area and corresponding vector. The raster/vector aligner generates a translation vector and confidence ratio from the translation information of the areas.

In another embodiment, the raster/vector aligner, receives raster data and a set of approximate vectors for features within the raster data. The raster/vector aligner subdivides the raster data into tiles with corresponding subsets of the approximate vectors. The raster/vector aligner generates translation information for each the tile. The raster/vector aligner generates global translation information for the raster data from the translation information of the tiles. The raster/vector aligner adjusts the raster data based on the global translation information to align with the set of approximate vectors.

Also, in an embodiment, a computer implemented raster/vector aligner may operate on a computer system.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

The patent or application file contains at least one drawing executed in color. Copies of this patent or patent application publication with color drawing(s) will be provided by the Office upon request and payment of the necessary fee.

Embodiments of the invention are described with reference to the accompanying drawings. In the drawings, like reference numbers may indicate identical or functionally similar elements. The drawing in which an element first appears is generally indicated by the left-most digit in the corresponding reference number.

FIG. 11 is an image of a graph of the combined filtered raster data and the corresponding raster data according to an embodiment of the present invention.

DETAILED DESCRIPTION OF THE INVENTION

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which the invention would be of significant utility.

Overview

The present invention relates to a computer program product and methods for identifying features from raster data and registration of raster data features with vector data. Examples include, but are not limited to, raster data having satellite images and vector data having road location information.

Figure 1:
FIG. 1 is an example image of raster data with overlaid vector data misaligned and the strongest detected road signals by the algorithm.
Figure 2:
FIG. 2 is an example image of raster data with overlaid vector data correctly aligned.

FIG. 1 depicts an example of raster data in the form of a satellite image. The figure shows street map vectors in blue and detected streets in red. As can be seen in FIG. 1, many of the street map vectors are misaligned. FIG. 2 depicts the same satellite image with aligned road data in blue.

Figure 3:
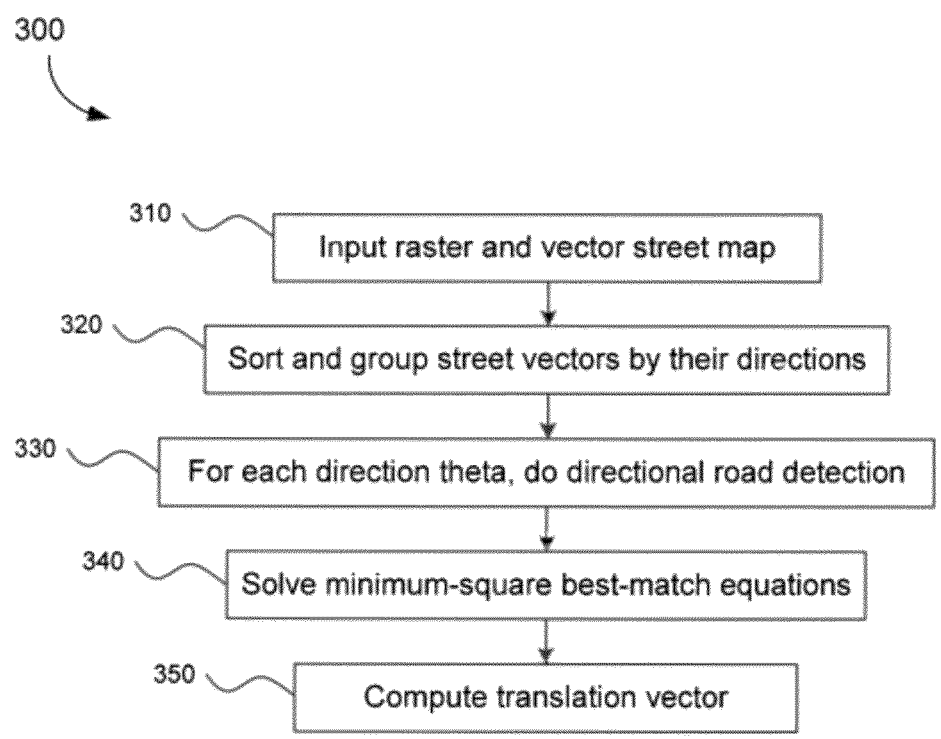
FIG. 3 is a flow chart diagram of a method for aligning raster and vector data according to an embodiment of the present invention.

According to an embodiment, an overview of the method of aligning raster and vector data is provided as flow diagram 300 in FIG. 3. In block 310, raster and vector data are inputted. In block 320, street vector data is sorted by their directions. The algorithm to automatically align the image and street map has two main parts. First, for each direction, road detection is executed at block 330. Second, minimum-square best-match equations are solved in block 340. Finally, in block 350, a translation vector is computed. This method is depicted in greater detail in flow diagram 400 of FIG. 4 and explained in greater detail below.

Image and Vector Preprocessing

Figure 4:
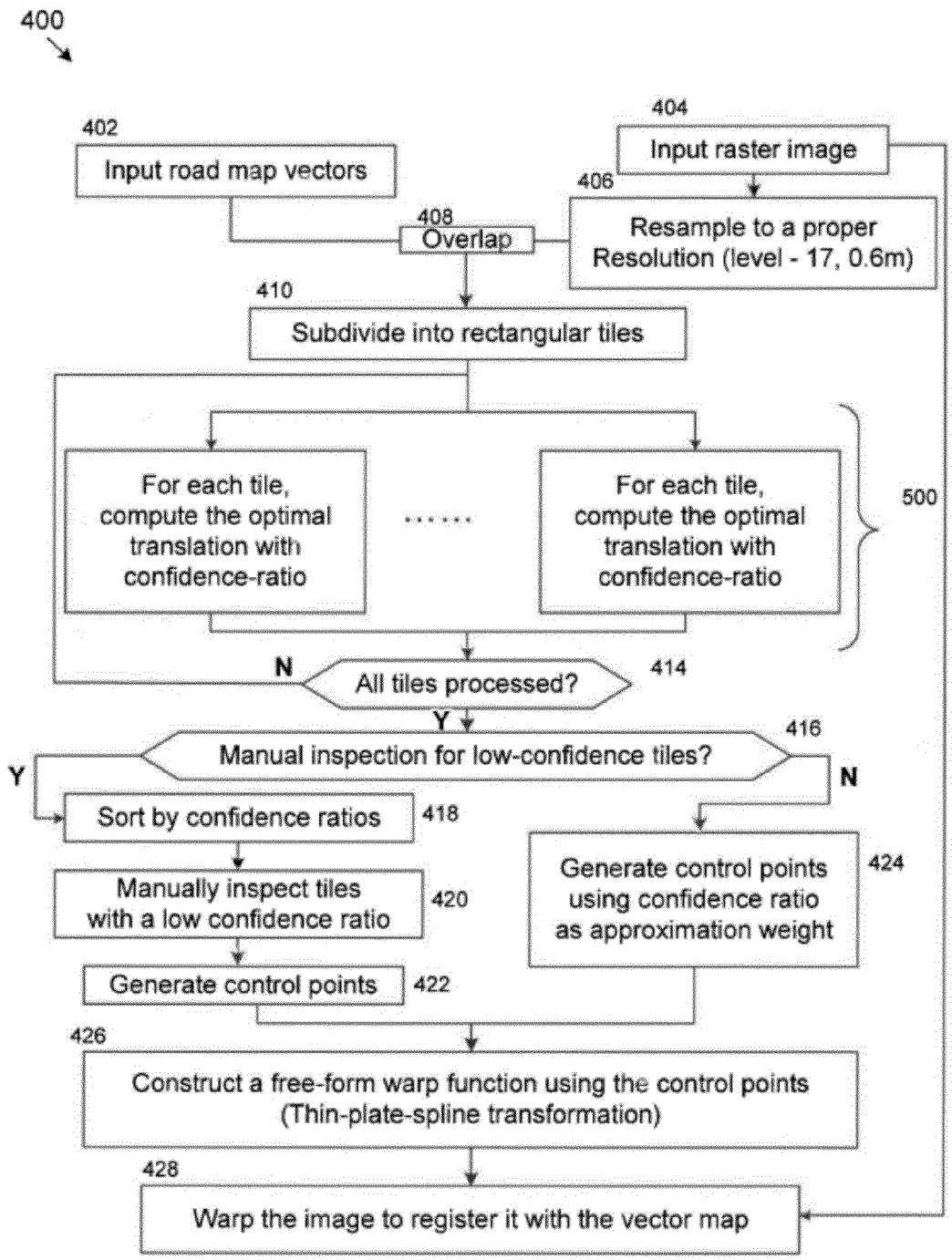
FIG. 4 is a flow chart diagram of a method for aligning raster and vector data according to an embodiment of the present invention.
Figure 5:
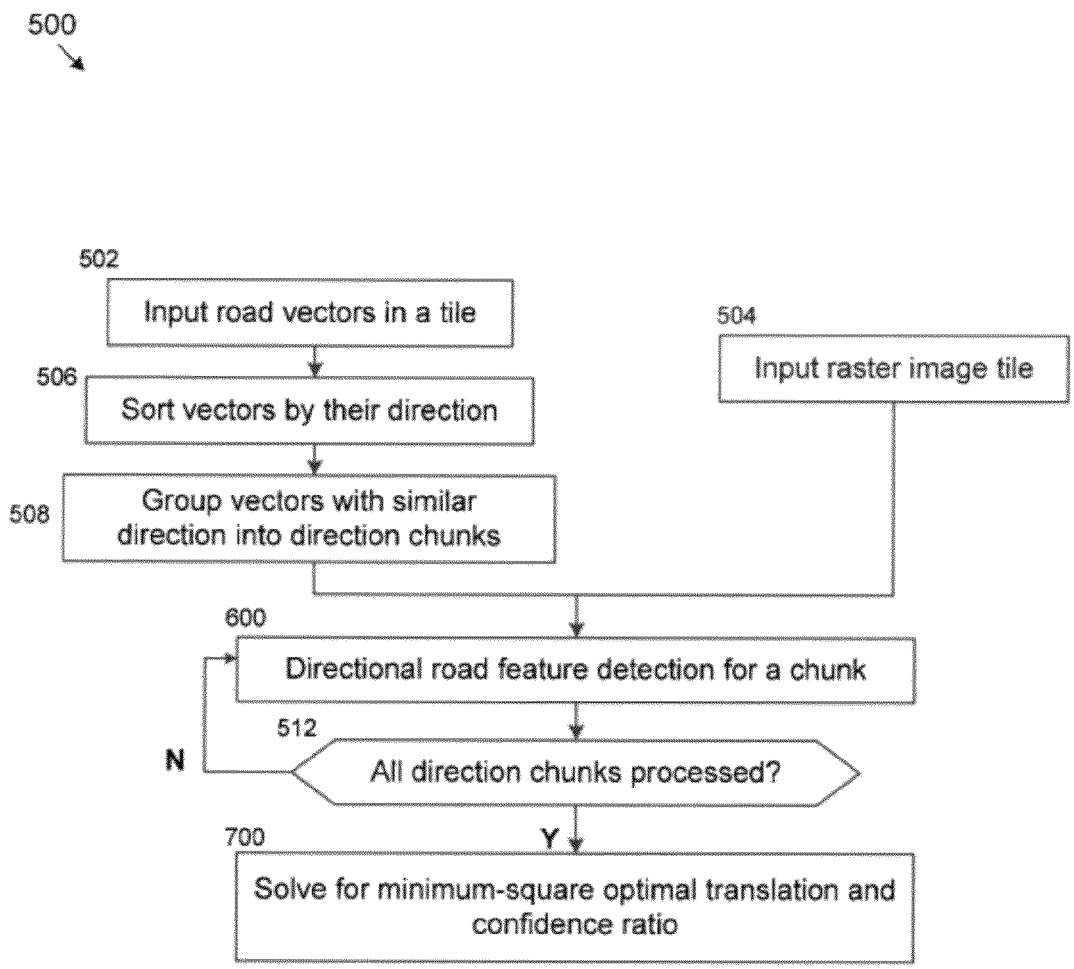
FIG. 5 is a flow chart diagram of a method for computing optimal translation and confidence ratio for a single tile according to an embodiment of the present invention.

As shown in FIG. 4, after the vector and raster data are inputted (402, 404), a series of preprocessing steps are executed. In an embodiment, the raster data is scaled to a designed resolution level 17 at block 406. A resolution level of 17 is preferable. However, other resolutions may be used. The benefits of this resolution level are described below. The vector and raster data may be overlapped, associating the approximate vectors with their projected locations on the raster data (block 408). In block 410, the input raster data and street vector map are subdivided into smaller rectangular tiles with common widths and heights. This step is necessary because the data to be processed usually covers a large area and the mismatch between the raster data and the street vector map is very complicated globally. FIG. 5 depicts the algorithm for computing the optimal translation and confidence ratio for each of these tiles. This algorithm is repeated until all tiles are processed (block 414). By this subdivision, the mismatch inside each tile is relatively simple and it is possible to approximately align the image tile with the vector tile with a rigid translation. With the consideration of distributed processing and the resource limits of a general computer system, it is also practical and more plausible to process subdivided images instead of very large images.

However, the size of the smaller sub-pieces should be limited. First, a sub-piece or a tile has to be large enough to contain a road feature in it. To recognize the road segment features inside each tile, the tile size should also be large enough to contain long street segments so that its signal can be stronger than noise signals such as those from buildings, slim parking lots, etc.

The resolution of the input raster data is also chosen carefully for both precision and efficiency. This approach can be applied over a range of resolution, given that the linear road signal is still present. However, using too low a resolution will sacrifice the precision of the result. Conversely, too high a resolution will make feature recognition unnecessarily expensive because of the large amount of data to be processed.

In the application of this algorithm, the input resolution level is chosen to be 17, which has a resolution of 0.66 meter. Another reason to choose this resolution, besides precision and efficiency, is that the data at this level has the largest coverage in the database. The tile size can be set to 4096× 4096 pixels, for example. Other tile sizes have also been tested, and the algorithm works for tile sizes as small as 1024×1024 pixels.

Road Detection

Road Feature Definition

A directional road extraction method is designed based on a mathematical model of road features. The physical characteristics of roads and streets in orthogonal aerial images are summarized as follows: (1) straight and linear; (2) long and continuous; (3) often with a certain width; (4) often with parallel boundary; and (5) smoothness along the direction of the road.

The presented algorithm is based on these characteristics of road features. The majority of roads and streets are straight and linear, which indicates that edge detection is helpful in road extraction. The continuous feature of road implies that some form of aggregation is applicable to increase the precision and robustness. The width and the boundary curb features are more obvious in high resolution imageries, but it still applies to low resolution as well. The road width is almost constant within a certain segment of the road regardless of resolution, and usually the road color is different from its two sides. The smoothness feature is helpful to distinguish road signals from other signals that happen to be arranged linearly such as buildings.

Besides these major characteristics of road features, the algorithm also makes good use of existing vector data and takes advantage of the nature of a mismatch. Following are two additional characteristics of road features. First a road feature is located within a predefined search buffer nearby a road vector, and second a road feature is located almost parallel to its corresponding road vector.

Road Feature Detection

Figure 6:
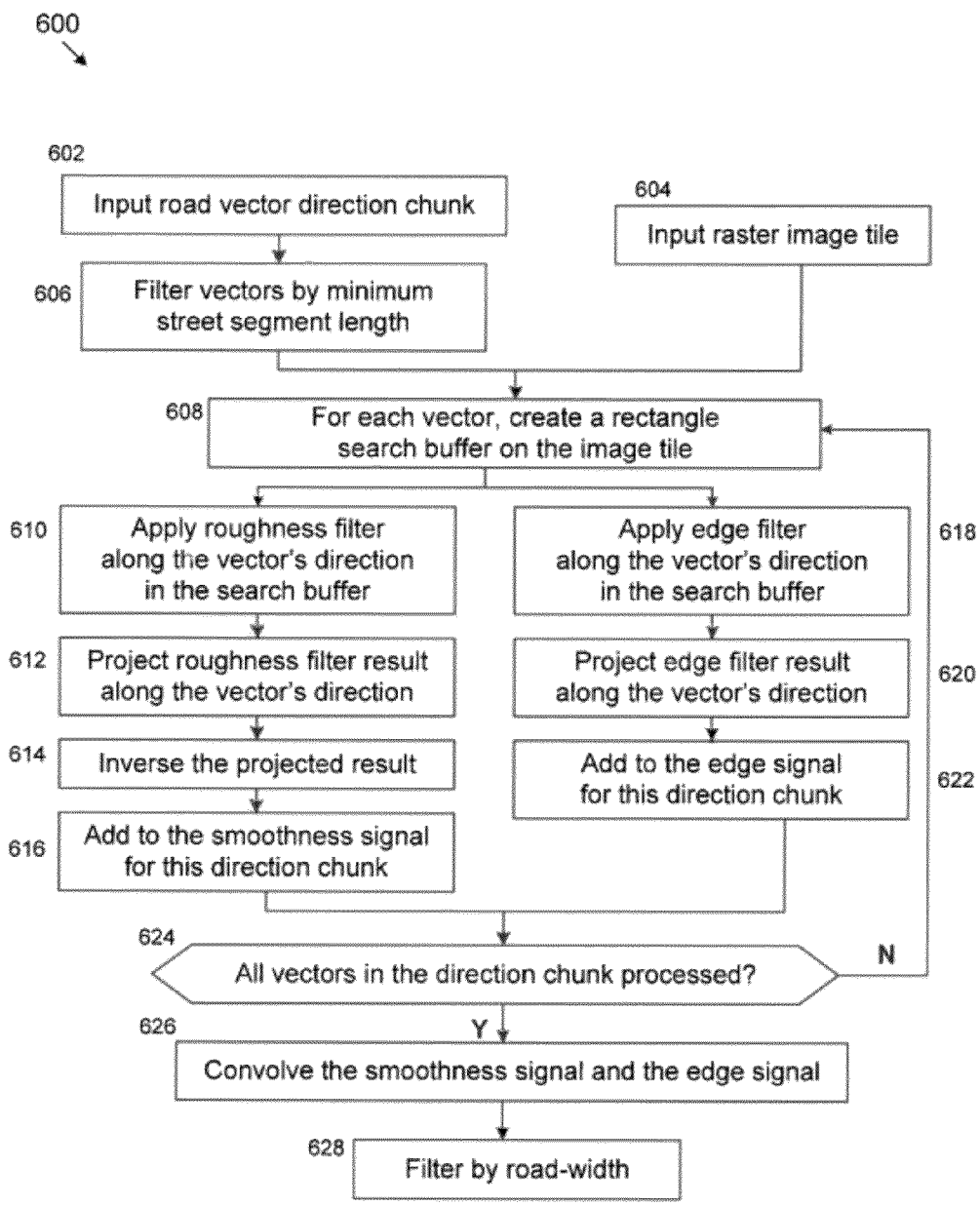
FIG. 6 is a flow chart diagram of a method for directional road feature detection according to an embodiment of the present invention.

In an embodiment, a road feature detection algorithm is able to quickly and robustly detect the location of a street from a given street vector and a search buffer within a tile. In a further embodiment, such as that depicted in flow diagram 500 of FIG. 5, raster data tiles and their corresponding road vectors are inputted from the subdivision block 410 of FIG. 4 (blocks 502 and 504), sorted by their direction (block 506), and grouped into directional chunks based on their direction (block 508) prior to the road feature detection algorithm. This is described in greater detail in the Directional Aggregation section below. FIG. 6 depicts the directional road detection algorithm for one of these directional chunks. A single vertical street vector is used as the road direction chunk in the explanation. However, the method is not limited to use of a single vector.

Directional Road Detection

Figure 8:
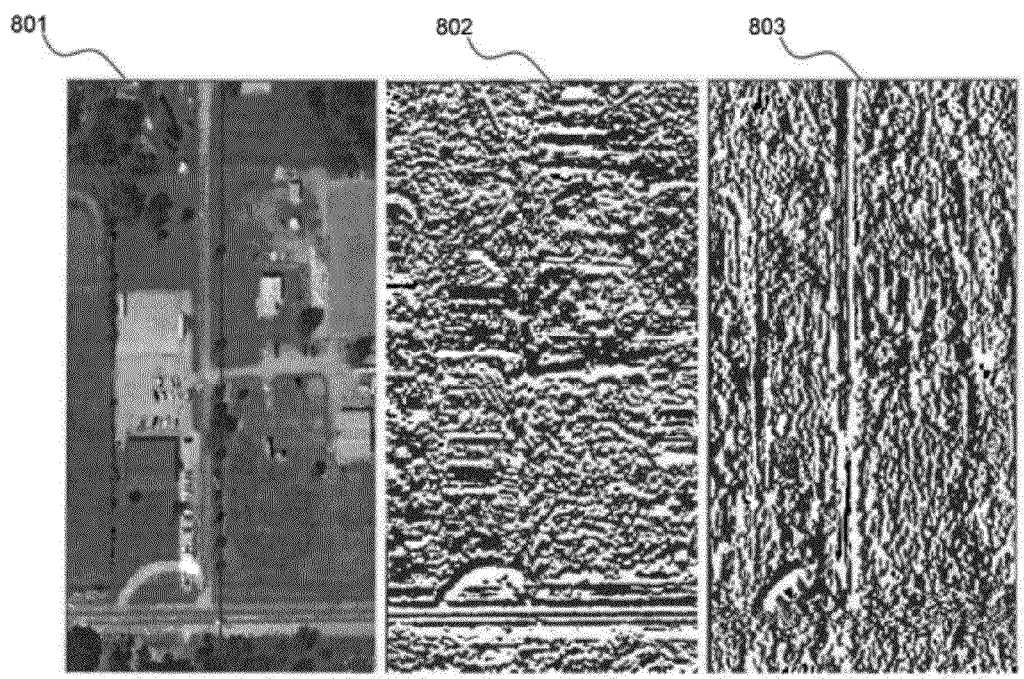
FIG. 8 is an image of raster data and filtered images of the same according to an embodiment of the present invention.

In an embodiment, such as that depicted in flow diagram 600 of FIG. 6, the input road vector direction chunk (block 602) is first filtered by a minimum street segment length (block 606). The next step for directional road detection is to create a rectangular search buffer around each street vector (block 608) on the corresponding image tile (block 604), where each street vector has a certain direction and length. The rectangular search buffer is of the same length as the street vector around which it was created. The width of the buffer is determined by a predefined maximum mismatch amount. The algorithm will work on the sub-image defined by the buffer. An example of a sub-image defined by a rectangular buffer is depicted in image 801 of FIG. 8. Next, the sub-image is filtered by a roughness filter along the street vector (block 610). A roughness filter is like an edge filter on the perpendicular direction of the street vector. An example of a sub-image filtered by a roughness filter is depicted in image 802 of FIG. 8. The sub-image is also filtered by an edge filter along the street vector direction (block 618). An example of a sub-image filtered by an edge filter is image 803 of FIG. 8.

Figure 9:
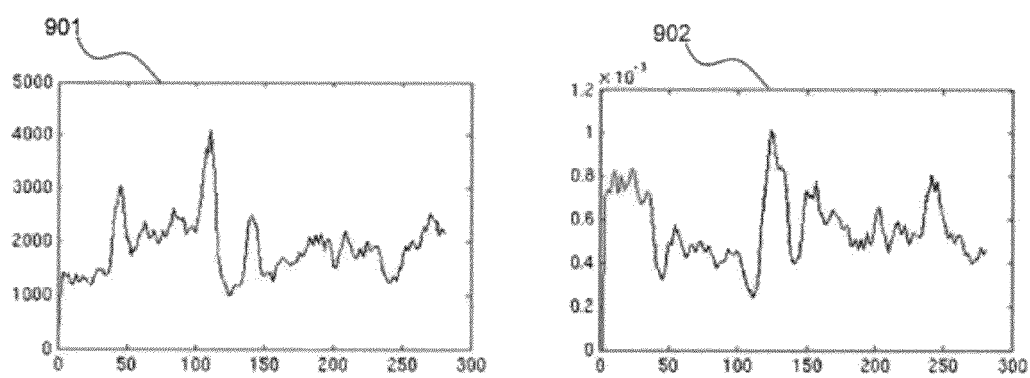
FIG. 9 is an image of graphs of roughness filtered raster data according to an embodiment of the present invention.
Figure 10:
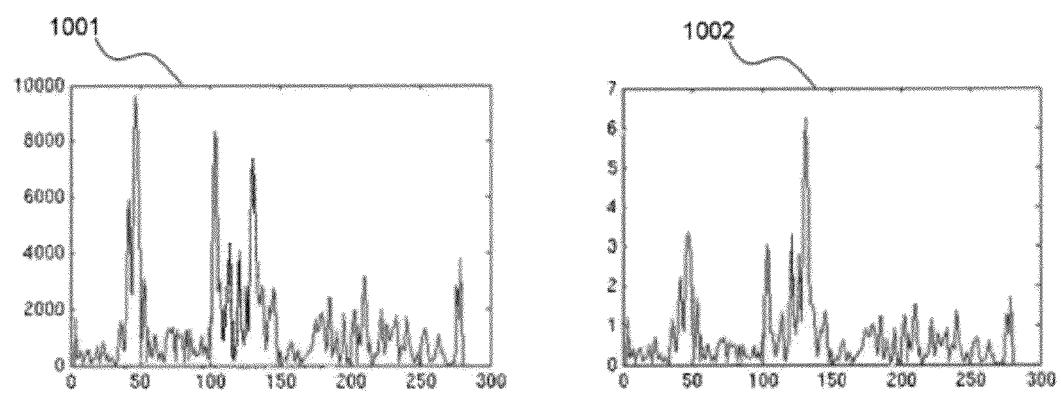
FIG. 10 is an image of graphs of edge filtered raster data according to an embodiment of the present invention.

Following the roughness filtering, a smoothness signal is generated. This is done by projecting the roughness filter result along the street vector direction (block 612), and applying an inverse transform to make the smoothness signal (block 614). The roughness filter result is depicted in plot 901 of FIG. 9. The result after an inverse transform is applied is depicted in plot 902 of FIG. 9. An edge signal is also projected. The edge signal is projected by projecting the edge filter result along the street vector direction to generate an edge signal (block 620). In an embodiment, the above is repeated for all vectors in the directional chunk (block 624) and the roughness filter and edge filter projected results are aggregated across all vectors in the direction chunk (blocks 616 and 622). Next a coarse street signal is generated by convolving the edge signal and the smoothness signal (block 626). The edge filter result is depicted in plot 1001 of FIG. 10. The result after generating the coarse street signal is depicted in plot 1002 of FIG. 10. Noise created by the boundary of a parking lot in the projected edge signal is filtered by the smoothness signal and its strength is reduced in the coarse street signal. Finally, the street signal is generated by filtering the coarse street signal using a minimum street width filter (block 628). The filtered coarse street signal is depicted in plot 1101 of FIG. 11. The filtered coarse street signal is overlaid on the sub-image in image 1102 of FIG. 11 for demonstration. The peak position of the street signal is the most probable location of the detected street. In an embodiment of the invention, multiple peak locations have been selected for each direction to increase the robustness.

Directional Aggregation

Referring back to FIG. 5, the directional road detection algorithm is applied to all the road segments defined in the vector data (block 512). For a given road vector, the detection result is not very reliable. The imagery or the vector data may be outdated and there may be no road feature to be found to match, or conversely, there may be multiple streets near a certain vector and the correct one may not have the strongest signal. To overcome this problem, the road vectors are sorted by their directions and grouped into discrete direction chunks (blocks 506 and 508). For each direction chunk, the projected street signals are all aggregated together before "peak selection" (blocks 616 and 622 of FIG. 6). The aggregated signal is more reliable than each individual signal, hence the peak selection result is more robust.

An optional parameter in aggregation is the estimated width of the road, which is generated from the road type information available in the road vector database. This parameter can be used to give major roads, such as inter-state highways, a priority in matching over local streets.

Figure 12:
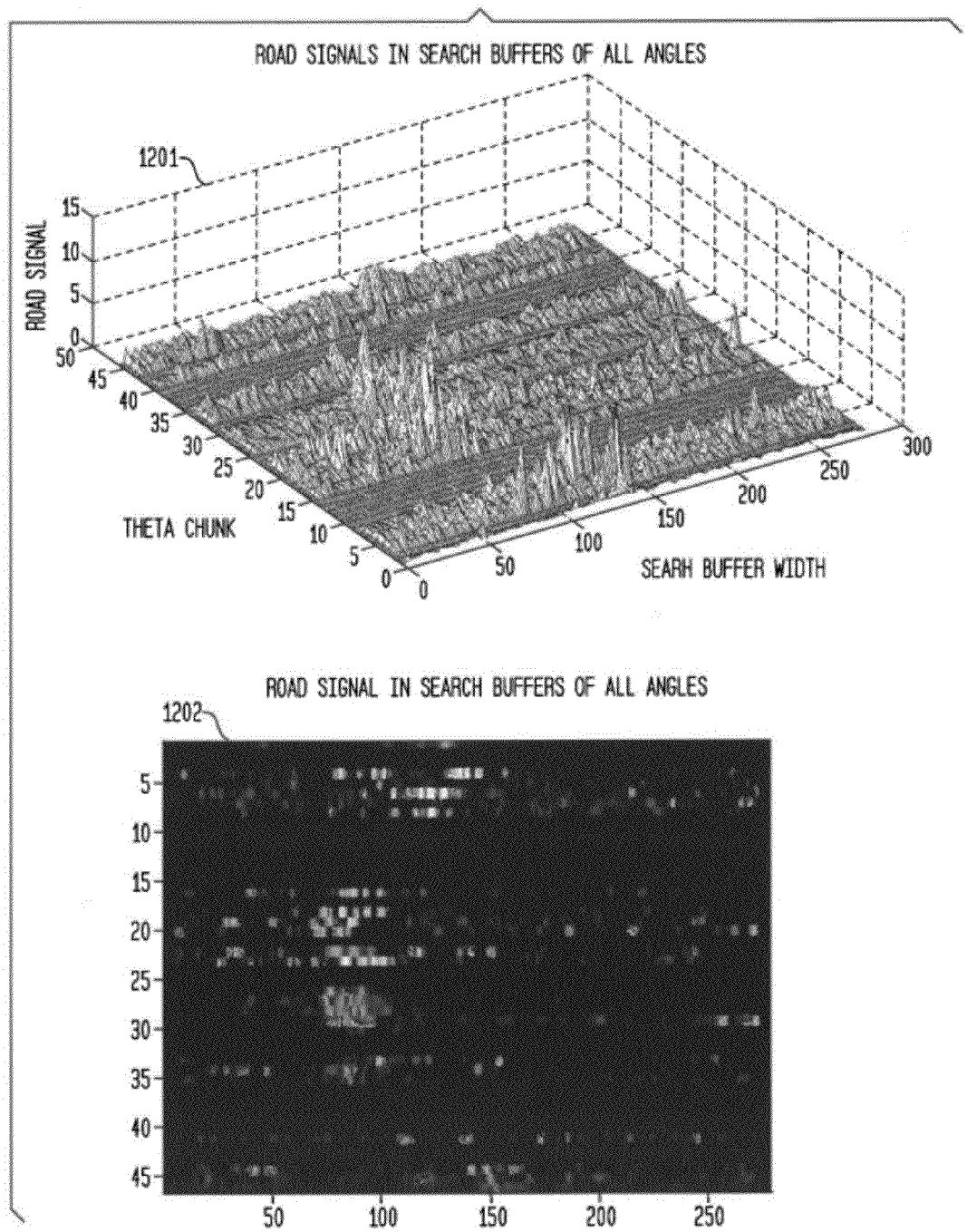
FIG. 12 is an image of representations of the aggregated road location signals according to an embodiment of the present invention.

FIG. 12 shows the aggregated road location signals of all the directions for the example in FIG. 1 with a constant road width for resolution level 17 imagery. A 3D representation of the aggregated road location signals is depicted in plot 1201 of FIG. 12, and a 2D projection of the same is depicted in plot 1202 of FIG. 12.

Minimum-Square Best-Match Translation

Figure 7:
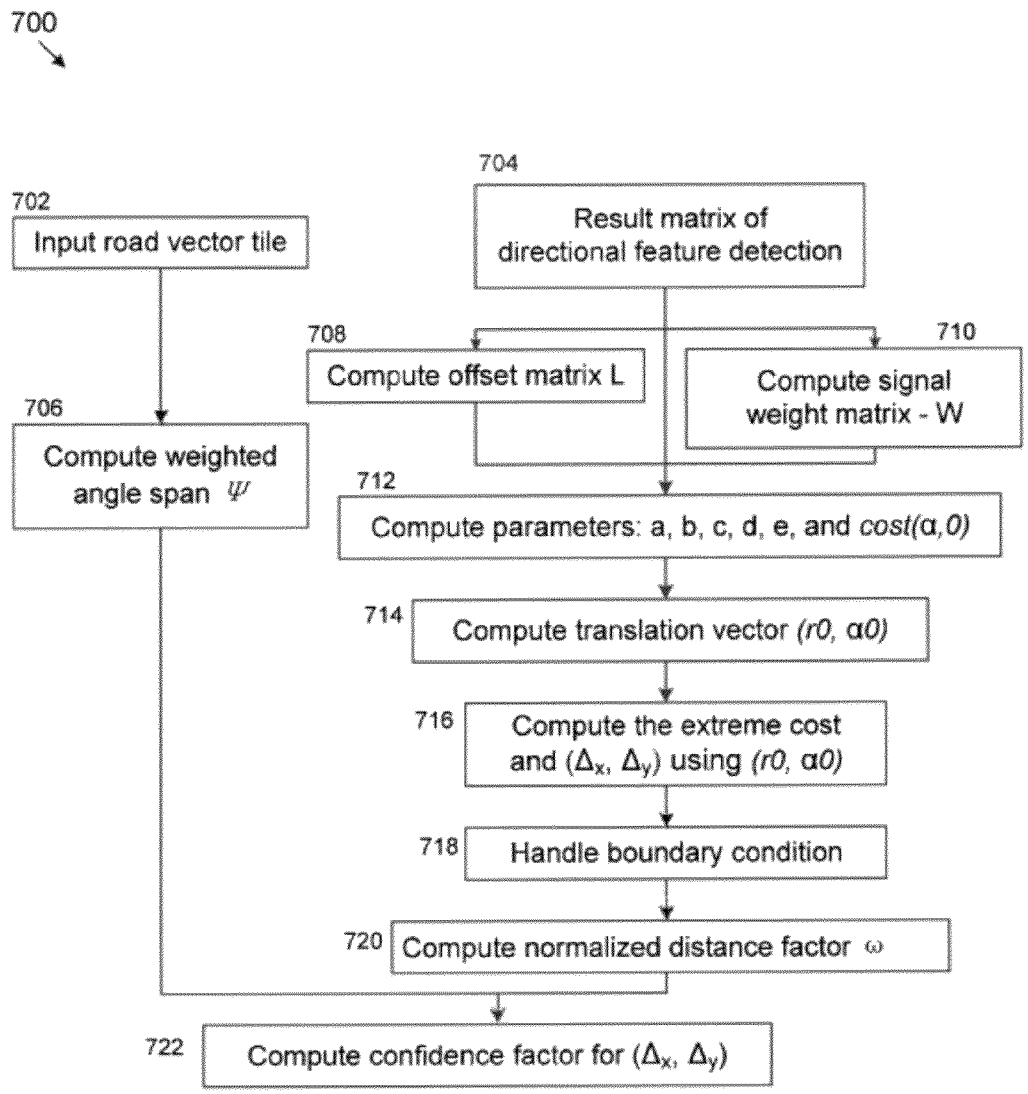
FIG. 7 is a flow chart diagram of a method for computing minimum-square optimal translation and confidence ratio according to an embodiment of the present invention.

FIG. 7 depicts the minimum-square matching approach to detect the optimal translation vector for each tile. This approach is applied after the possible street locations in all the directions are detected. The results of directional feature detection for each tile and the corresponding vectors (blocks 702 and 704) are inputted from the road feature detection (flow diagram 600 of FIG. 6).

A target cost function is defined first to model the mismatch between detected roads and input road vectors. For a certain tile, suppose its corresponding road vectors have I different directions and the search buffer size is $r_{max}$ on both sides of each road vector. For road vectors in the $i^{th}$ direction, $\theta_i$ is the angle of the perpendicular vector of these roads with the positive x-axis. The angles are then normalized so that $\theta_i \in (-\pi/2, \pi/2]$. In the aggregated directional road signals, assume $J_i$ possible road locations have been detected for angle $\theta_i$. Let $(r, \alpha)$ represent a translation vector with length $r \in [-r_{max}, r_{max}]$ and direction $\alpha \in (-\pi/2, \pi/2]$, then the cost function can be expressed as:

$$\text{cost}(r, \alpha) = \sum_{i=1}^{I} \sum_{j=1}^{J_i} W_{i,j}(L_{i,j} - r\cos(\alpha - \theta_i))^2 \quad (1)$$

where $L_{i,j}$ is the $j^{th}$ road signal location for direction $\theta_i$, and $W_{i,j}$ is the weight of the $j^{th}$ road signal location for direction $\theta_i$. Matrix L is computed from the results of the directional feature detection at block 708 of FIG. 7. So the cost function is actually a weighted square sum of the distance between detected locations of road vectors and the translated road vector using a certain translation vector $(r, \alpha)$.

Let $$\frac{\partial}{\partial r}(\text{cost}) = 0 \text{ and } \frac{\partial}{\partial \alpha}(\text{cost}) = 0,$$

solve the equations and a possible global minimum cost value can be found for a certain $(r, \alpha)$, while still checking for boundary conditions.

To better understand this cost function, consider an ideal situation where all road vectors are either vertical (i=1) or horizontal (i=2), and the road vectors need to shift right 20 pixels ($\Delta x=+20$, $\Delta y=0$) to make a perfect alignment. For now, assume all the weights are 1.0 ($W_{i,j}$≡1.0) and only the strongest signal is picked for a direction ($J_i$≡1). Since I=1, $\theta_1=0$ and $\theta_2=\pi/2$, equation (1) becomes:

$$\text{cost}(r,\alpha) = (L_{1,1} - r\cos(\alpha))^2 + (L_{2,1} - r\sin(\alpha))^2$$

Suppose the presented road detection algorithm also works precisely as expected for this case, then $L_{1,1}$ should be 20 and $L_{2,1}=0$. So the optimal value of this cost function can be found at r=20 and α=0.

Figure 13:
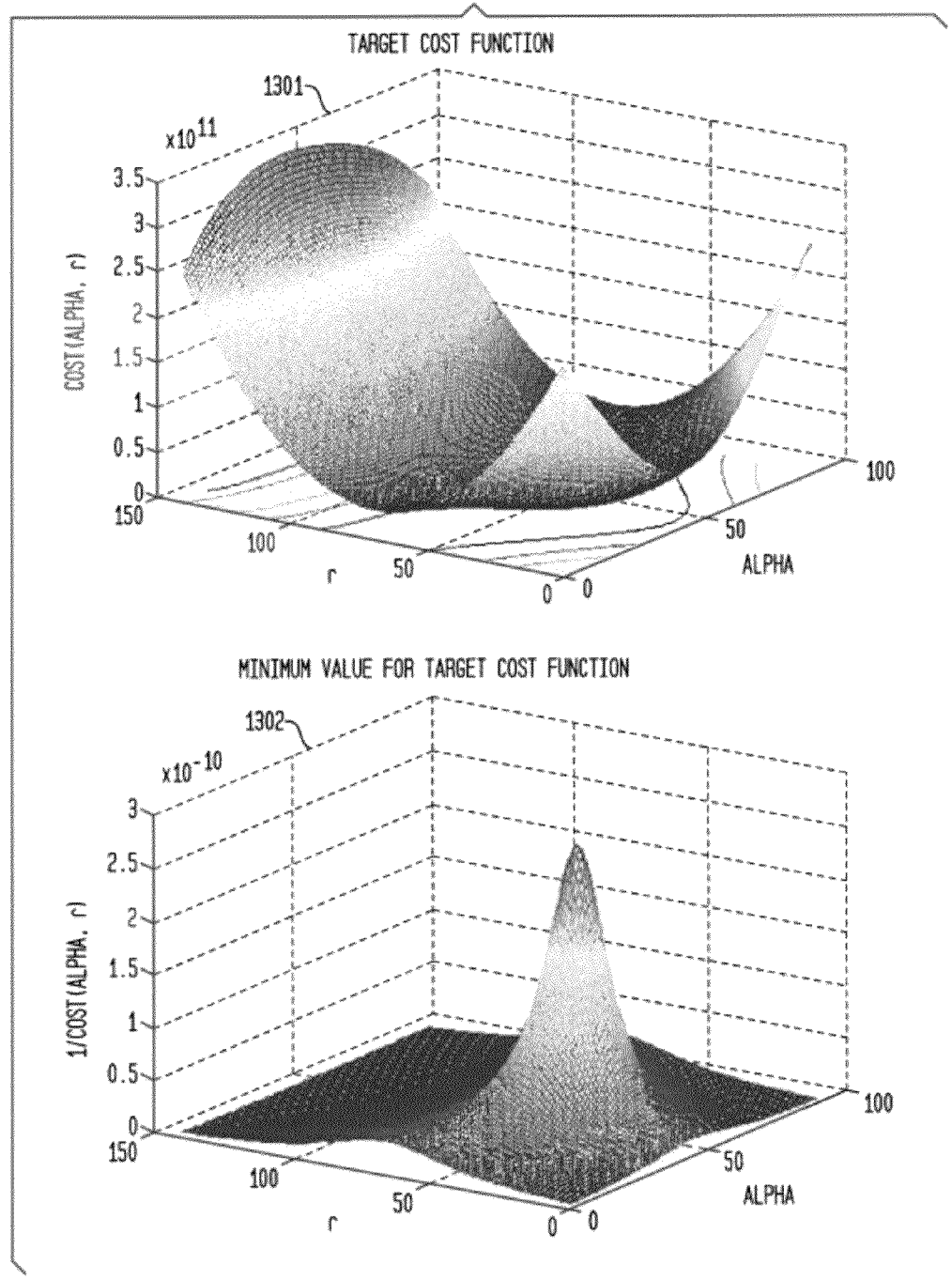
FIG. 13 is an image of representations of the cost function according to an embodiment of the present invention.

FIG. 13 depicts two 3D representations for function cost $(r, \alpha)$ generated for the example in FIG. 1. A 3D mesh is depicted in 1301, and, to better visualize the minimum value location of the function, the inverse value 3D mesh is depicted in 1302.

Road Signal Weight Computation

The weight for each possible location of a road vector is proportional to the detected road signal strength at that location. It is also proportional to the length of the road vector, because the longer the vector is, the higher possibility the algorithm has to detect the road correctly from locally similar noises such as those from buildings, parking lots, etc.

Since the filters used in directional road detections are specifically designed for road features, it is reasonable to expect that the detected road signal will have an extraordinarily strong response at the real location of the road in the image, while the majority of signal responses are more like random noises. So another parameter is used in computing the weight, that is, how distinguished the signal response is at the location compared to the average response. For the presented algorithm, the average and the standard deviation of the signal responses for a direction are computed for this purpose.

Following is the formula to compute $W_{i,j}$ for direction i location j (block 710):

$$W_{i,j} = R_{i,j} \sum_{s=1}^{S_i} \text{length}_{i,s}(R_{i,j} - \text{average}(R_i)) / (2std(R_i)) \quad (2)$$

where $R_{i,j}$ is the detected road signal for direction i at location j, and $\text{length}_{i,s}$ is the length of the $s^{th}$ vector of the total $S_i$ vectors in direction chunk i. Values $\text{average}(R_i)$ and $std(R_i)$ are the average and standard deviation values for all road signals in direction i.

Solve for Global Optimal Translation

A possible global optimal translation can be found by solving the following equations:

$$\begin{cases} \frac{\partial}{\partial r}(\text{cost}) = \sum_i \sum_j W_{i,j}(L_{i,j} - r\cos(\alpha - \theta_i))(-\cos(\alpha - \theta_i)) = 0 \\ \frac{\partial}{\partial \alpha}(\text{cost}) = r\sum_i \sum_j W_{i,j}(L_{i,j} - r\cos(\alpha - \theta_i))\sin(\alpha - \theta_i) = 0 \end{cases} \quad (3)$$

From equations (3), it is easy to get the following when $r \neq 0$:

$$\begin{cases} e\sin\alpha - d\cos(\alpha) = r(c(\sin^2(\alpha) - \cos^2(\alpha)) + (b-a)\sin(\alpha)\cos(\alpha)) \\ e\cos\alpha + d\sin(\alpha) = r(a\sin^2(\alpha) - b\cos^2(\alpha) + 2c\sin(\alpha)\cos(\alpha)) \end{cases} \quad (4)$$

where $$a = \sum_{i,j} W_{i,j}\sin^2(\theta_i) \qquad b = \sum_{i,j} W_{i,j}\cos^2(\theta_i) \quad (5)$$

$$c = \sum_{i,j} W_{i,j}\sin(\theta_i)\cos(\theta_i)$$

$$d = \sum_{i,j} W_{i,j}L_{i,j}\sin(\theta_i) \qquad e = \sum_{i,j} W_{i,j}L_{i,j}\cos(\theta_i)$$

Parameters a, b, c, d, and e, are computed at block 712. When equations (4) are solved, and when $ae \neq cd$, the stationary point for an extremum of cost can be found as $$\begin{cases} \alpha_0 = \arctan\left(\frac{bd - ce}{ae - cd}\right) \\ r_0 = \frac{1}{\cos(\alpha)} \frac{d\tan(\alpha) + e}{a\tan^2(\alpha) + 2c\tan(\alpha) + b} \end{cases} \quad (6)$$

Given the computed translation vector $(r_0, \alpha_0)$ (block 714), the corresponding translation (block 716) for x and y is $$\begin{cases} \Delta x = r_0 \cos(\alpha_0) \\ \Delta y = r_0 \sin(\alpha_0) \end{cases}$$

Note that theoretically the solved $(r_0, \alpha_0)$ is only one of several possible extrema for cost$(r, \alpha)$, and if it is not a minimum, then the real optimal minimal cost may be found on the boundary values of $\alpha$ and r. However, in practical application, the solution (6) is usually how the target cost function gets its global optional minimum.

Special Cases

There are a few special cases that have been ignored in finding the solution to equation (3). So the costs for these special cases are computed separately.

Using the parameters in equations (5), the original cost(r, $\alpha$) function can be rewritten as the following to make it easy to compute.

$$\text{cost}(r,\alpha) = r^2(a\sin^2(\alpha) + b\cos^2(\alpha) + 2c\sin(\alpha)\cos(\alpha)) - 2r(e\cos(\alpha) + d\sin(\alpha)) + C_0 \quad (7)$$

where $C_0 = \Sigma_{i,j} W_{i,j} L_{i,j} = \text{cost}(\alpha, 0)$, computed at block 712, is the original cost of the mismatch without any translation.

Following is a list of special cases and degenerated cases that need to be treated with extra care:

(1) r=0: for any $\alpha$, cost$(r,\alpha)|_{r=0} = \Sigma_{i,j} W_{i,j} L_{i,j} = C_0$ is computed and compared with cost$(r_0, \alpha_0)$ to verify that cost$(r_0, \alpha_0)$ is the global minimum cost value.

(2) $r \neq 0$ and $\cos(\alpha) = 0$: cost$(\pi/2, r) = ar^2 - 2dr + C_0$ is computed and compared with cost$(r_0, \alpha_0)$.

(3) $r \neq 0$, $\cos(\alpha) \neq 0$, ae=cd and ce$\neq$bd: for this case, no extremum exists.

(4) ae=cd and ce=bd: for this case, $\alpha$ can be any angle and there will still exist a corresponding r to make a minimum value for cost(a,r). This is a degenerated case and will happen when there is only one direction for all the roads in the tile, which rarely occurs in real data. For such degenerated cases, it is trivial to find the optimal translation direction, which should be perpendicular to the only direction of the roads, and the translation amount r will be the minimum of all the extrema.

Boundary Condition

The solution presented in equation (6) is one of a few stationary points of function cost$(r, \alpha)$ and it is necessary to verify it is the optimal global minimum.

The cost function will have its minimum at the computed stationary point when its second derivatives satisfy the requirements in (8) (below) at the point. For this case, boundary condition does not need to be considered and the global optimal value is either at the computed stationary point or at one of the special cases analyzed in the Special Cases section above.

$$\begin{cases} \left(\frac{\partial^2}{\partial r \partial \alpha}(\text{cost})\right)^2 - \frac{\partial^2}{\partial r^2}(\text{cost})\frac{\partial^2}{\partial \alpha^2}(\text{cost}) < 0 \\ \frac{\partial^2}{\partial \alpha^2}(\text{cost}) > 0 \text{ or } \frac{\partial^2}{\partial r^2}(\text{cost}) > 0 \end{cases} \quad (8)$$

Otherwise, the function cost$(r, \alpha)$ may have a local maximum at $(r_0, \alpha_0)$, or does not have an extreme value at the computed stationary point, and it is necessary to check the boundary conditions of function cost$(\alpha, r)$ at block 718.

Since cost(α,r) is a periodic function for α, only the boundary condition for r needs to be checked. For both r=$r_{max}$ and r=−$r_{max}$, dense samples are made for a in the range (−π/2, π/2] and corresponding cost(r,α) values are computed. These values are compared against the value at ($r_0$,$α_0$) to make sure the global minimum of cost value is always found correctly.

Although the boundary sampling approach does not look efficient, it has little impact on the overall performance of the algorithm because using real data it is very unlikely the algorithm ends up computing boundary samples. In all the several hundreds of experiments using real GIS data, the requirements in (8) are always met so boundary sampling does not contribute to the computational cost.

Confidence Ratio

As many other computer vision algorithms, there will always be special cases where the presented automatic road detection algorithm does not work. The algorithm would be more practically useful if it could report whether its results are reliable or not. So one of the design goals of the algorithm is to provide a confidence ratio together with the recommended translation vector to provide some quantitative measurement of the result.

The confidence ratio generated from the algorithm, at block 722, is composed of the weighted angle span factor ψ, computed at block 706, and the normalized distance factor ω, computed at block 720, as follows:

$$\text{confidence} = \frac{\psi}{\omega}$$

Normalized Distance Factor

The normalized distance factor ω is derived from the computed final cost value of the target function cost(r,α). It can be efficiently computed using the already computed parameters in equations (5) (block 720).

$$\omega = \sqrt{\frac{\text{cost}(r_0, \alpha_0)}{\sum_{i,j} W_{i,j}}} \quad (9)$$

The normalized distance factor ω describes the average distance between the detected roads and the input road vector after applying the computed translation. For an ideal situation where the detected roads in all directions perfectly align with the input vector after translation, ω will be zero or infinitely small. If after the computed translation has been applied and some or all of the detected roads still have an offset distance from the target vectors, ω will be of a relatively large value and indicate that something might be wrong.

Weighted Angle Span

The weighted angle span factor is designed to capture the quality of the input vector data. Let $V_i$ be an aggregated road vector with direction $θ_i$ and length $\sum_{S=1}^{Si} \text{length}_{i,s}$, then the weighted angle span is defined as:

$$\psi = \frac{\max\{\|V_i \times V_j\| \mid i, j \in I\}}{\max\{\|V_i\|^2 \mid i \in I\}} \quad (10)$$

In short, the weighted angle span is the largest normalized area defined by two aggregated road vectors (block 706).

There are several reasons for adding this factor. First, the spatial distribution of the road vector data is not uniform. For certain rural areas, very few or no road vector may exist, and the algorithm will have less data to aggregate for road signal detection, especially when the tile size used in subdividing the raster data is small. Second is that when all road vectors inside a tile have about the same direction, it is more like the last degenerated case discussed in the Special Cases section above. The translation precision will be more vulnerable to noises and local errors because many optimal solutions may exist for the minimum-square match, even though the road detection may still work perfectly. For such cases, the corresponding angle span will be relatively small, and can help to indicate a possible problem.

Approximation Interpolation and QA Using Confidence Ratio

In an embodiment, tiles with low-confidence ratios may be inspected (block 416 of FIG. 4). For applications where very precise alignment is not a critical requirement low-confidence tiles may not be manually inspected. With the help of the confidence ratio, a global warp method can generate better alignment results by assigning control point weight proportional to its confidence ratio, and computing an approximation warp instead of an interpolation at places of low confidence ratio. Thus, an automatic registration pipeline can be formed without human interaction.

For applications where very precise alignment is a critical requirement, the automatic alignment results can be sorted and filtered to find low reliability locations (block 418). Then the automatic generated translation at these locations can be manually examined and replaced with a correct translation when necessary (block 420).

Figure 14:
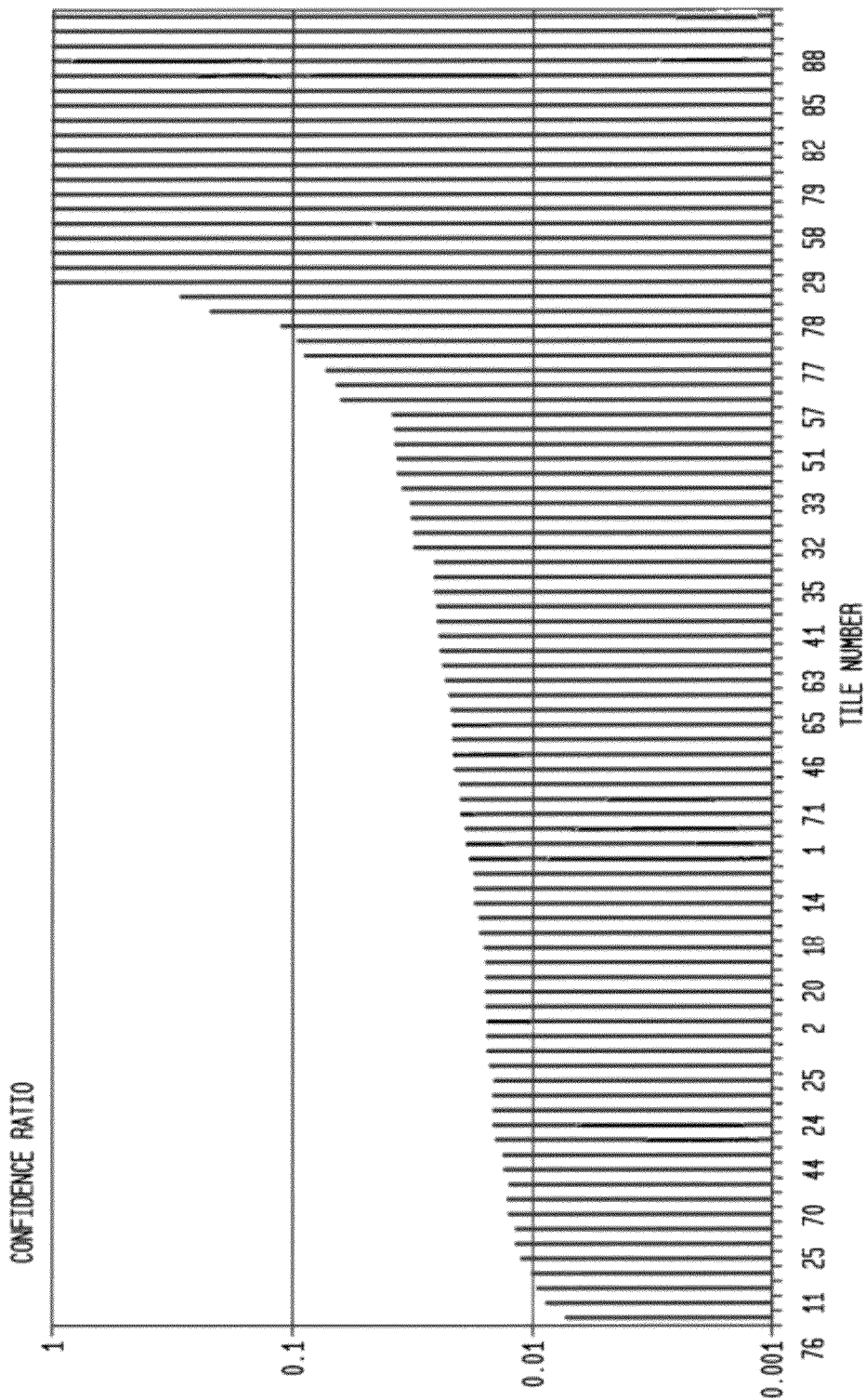
FIG. 14 is a graph of confidence ratios according to an embodiment of the present invention.
Figure 15:
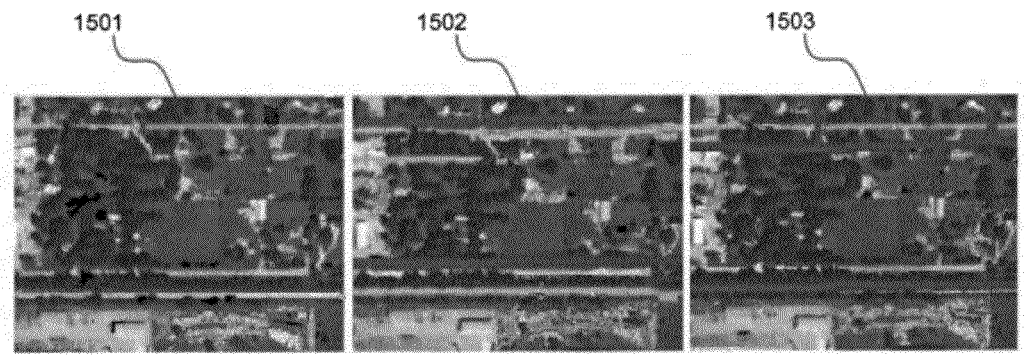
FIG. 15 is a depiction of a low confidence tile according to an embodiment of the present invention.

For example, FIG. 14 shows the computed confidence ratio for 89 tiles from an example dataset. Those tiles with a confidence ratio of 1.0 are results of empty image or vector data on the boundary of the image, which are safe to be ignored. To inspect the quality, only a few cases with relatively low confidence ratios need to be checked. FIG. 15 depicts three representations of the tile with the lowest confidence ratio. The image of this tile is depicted in 1501. In 1502, the vector data is overlaid on the tile in blue and the detected streets are overlaid in green and red. For this tile, the algorithm over-translated in the correct direction because there are two parallel streets in the horizontal vector search buffer but only one road vector in the road data, this is depicted in 1503. Because the lower road is longer and less obstructed, it outweighed the upper road. Upon manual examination, the translation vector for this tile may be replaced with the correct translation.

Automatic Alignment Warp Using Thin-Plate Spline Transform

From each tile, a pair of control points is generated using the computed translation vector for that tile (blocks 422 and 424 of FIG. 4). The source control point is chosen as the center pixel of the tile, and the corresponding target control point is the source control point plus the translation vector for the tile. The control points from all tiles form a mesh. A thin-plate spline transformation is generated using these control points (block 426) and warps the raster data to more closely align with the road data resulting in the final aligned raster and vector data (block 428).

Example Computer System Implementation

Figure 16:
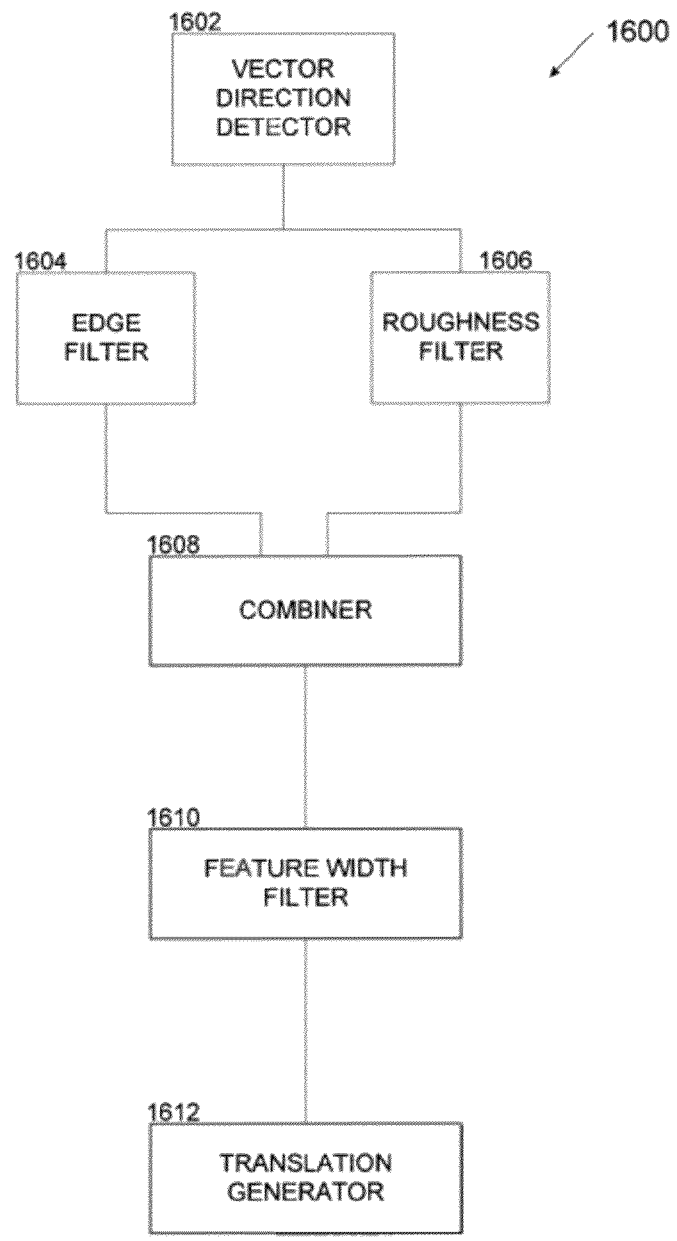
FIG. 16 is a block diagram of a raster data and vector data aligner according to an embodiment of the present invention.

Various aspects of the present invention can be implemented by software, firmware, hardware, or a combination thereof. FIG. 16 shows a raster data and vector data aligner 1600 according to an embodiment of the present invention. Raster data and vector data aligner 1600 includes a vector direction detector 1602, edge filter 1604, roughness filter 1606, combiner 1608, feature width detector 1610 and translation generator 1612. Raster data and vector data aligner 1600 can be implemented in by software, firmware, hardware, or a combination thereof, it can be part of any geographical information system.

Vector direction detector 1602 can detect the direction of an approximate vector of a feature within raster data. In one example vector director detector 1602 can carry out each of the blocks 506 and 508 described above. Edge filter 1604 can filter raster data in the detected direction to produce an edge signal. In one example edge filter 1604 can carry out each of the blocks 618, 620 and 622 described above. Roughness filter 1606 can filter raster data in the detected direction to produce a smoothness signal. In one example roughness filter 1606 can carry out each of the blocks 610, 612, 614 and 616 described above. Combiner 1608 combines the edge signal and the smoothness signal into a combined signal. In one example combiner 1608 can carry out block 626 described above. Feature width detector 1610 can filter the combined signal by a feature width before generating the translation information. In one example feature width detector 1610 can carry out block 628 described above. Translation generator 1612 uses the combined signal to generate translation information for the raster data. In one example translation generator 1612 can carry out each of the blocks in flow diagram 700 described above.

Figure 17:
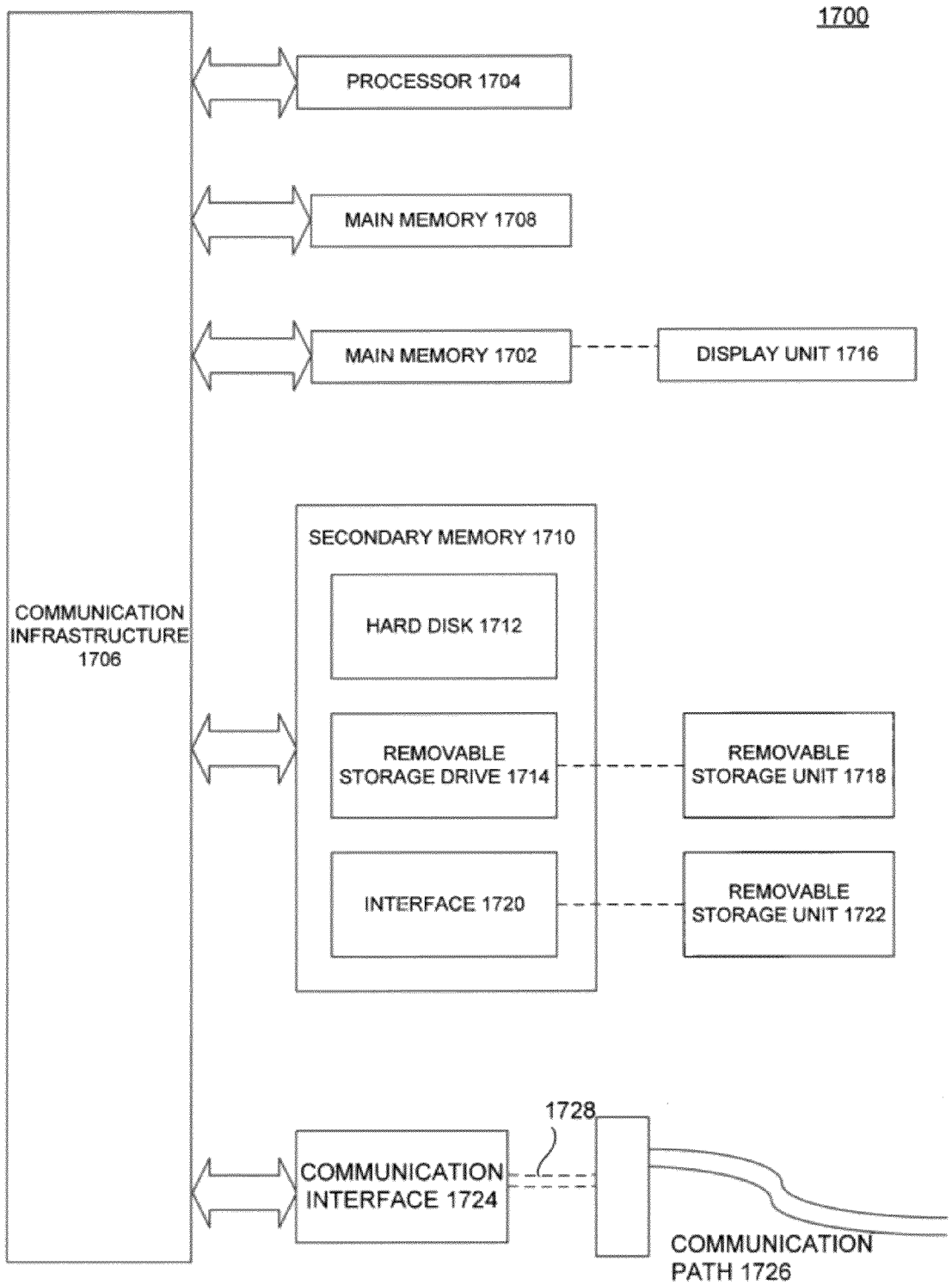
FIG. 17 is a diagram of an example computer system that can be used to implement an embodiment of the present invention.

FIG. 17 illustrates an example computer system 1700 in which the present invention, or portions thereof, can be implemented as computer-readable code. Various embodiments of the invention are described in terms of this example computer system 1700. After reading this description, it will become apparent to a person skilled in the relevant art(s) how to implement the invention using other computer systems and/or computer architectures.

Computer system 1700 includes one or more processors, such as processor 1704. Processor 1704 can be a special purpose or a general purpose processor. Processor 1704 is connected to a communication infrastructure 1706 (for example, a bus or network).

Computer system 1700 also includes a main memory 1708, and may also include a secondary memory 1710. Main memory 1708 may include, for example, cache, and/or static and/or dynamic RAM. Secondary memory 1710 may include, for example, a hard disk drive 1712 and/or a removable storage drive 1714. Removable storage drive 1714 may comprise a floppy disk drive, a magnetic tape drive, an optical disk drive, a flash memory, or the like. The removable storage drive 1714 reads from and/or writes to a removable storage unit 1718 in a well known manner. Removable storage unit 1718 may comprise a floppy disk, magnetic tape, optical disk, flash memory, etc., which is read by and written to by removable storage drive 1714. As will be appreciated by persons skilled in the relevant art(s), removable storage unit 1718 includes a computer usable storage medium having stored therein computer software and/or data.

In alternative implementations, secondary memory 1710 may include other similar means for allowing computer programs or other instructions to be loaded into computer system 1700. Such means may include, for example, a removable storage unit 1722 and an interface 1720. Examples of such means may include a program cartridge and cartridge interface (such as that found in video game devices), a removable memory chip (such as an EPROM, or PROM) and associated socket, and other removable storage units 1722 and interfaces 1720 which allow software and data to be transferred from the removable storage unit 1722 to computer system 1700.

Computer system 1700 may also includes a main memory 1702. Main memory 1702 may include, for example, cache, and/or static and/or dynamic RAM. Main memory 1702 may be separate from main memory 1708 or may be a part thereof. Main memory 1702 may be adapted to communicate with display unit 1716. Display unit 1716 may comprise a computer monitor or similar means for displaying graphics, text, and other data received from main memory 1702.

Computer system 1700 may also include a communications interface 1724. Communications interface 1724 allows software and data to be transferred between computer system 1700 and external devices. Communications interface 1724 may include a modem, a network interface (such as an Ethernet card), a communications port, a PCMCIA slot and card, or the like. Software and data transferred via communications interface 1724 are in the form of a plurality of signals, hereinafter referred to as signals 1728, which may be electronic, electromagnetic, optical, or other signals capable of being received by communications interface 1724. Signals 1728 are provided to communications interface 1724 via a communications path 1726. Communications path 1726 carries signals 1728 and may be implemented using wire or cable, fiber optics, a phone line, a cellular phone link, an RF link or other communications channels.

In this document, the terms "computer program medium" and "computer usable medium" are used to generally refer to media such as removable storage unit 1718, removable storage unit 1722, a hard disk installed in hard disk drive 1712, and signals 1728 carried over communications path 1726. Computer program medium and computer usable medium can also refer to memories, such as main memory 1708 and secondary memory 1710, which can be memory semiconductors (e.g. DRAMs, etc.). These computer program products are means for providing software to computer system 1700.

Computer programs (also called computer control logic) are stored in main memory 1708 and/or secondary memory 1710. Computer programs may also be received via communications interface 1724. Such computer programs, when executed, enable computer system 1700 to implement the present invention as discussed herein. In particular, the computer programs, when executed, enable processor 1704 to implement the processes of the present invention, such as the steps in the method illustrated by flowchart 400 of FIG. 4 discussed above. Accordingly, such computer programs represent controllers of the computer system 1700. Where the invention is implemented using software, the software may be stored in a computer program product and loaded into computer system 1700 using removable storage drive 1714, interface 1720, hard drive 1712 or communications interface 1724.

Embodiments of the invention also may be directed to computer products comprising software stored on any computer usable medium. Such software, when executed in one or more data processing device, causes a data processing device(s) to operate as described herein. Embodiments of the invention employ any computer usable or readable medium, known now or in the future. Examples of computer usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

What is claimed is:

1. A method of aligning raster data and vector data, comprising:
receiving, by one or more processors, raster data and a set of approximate vectors of vector data associated with features within the raster data;
identifying, by the one or more processors, directions of the approximate vectors and grouping the approximate vectors into one or more directional chunks based on their directions;
defining, by the one or more processors, search areas of the raster data for each directional chunk of the one or more directional chunks, each search area of the search areas encompassing at least one approximate vector of the set of approximate vectors;
detecting, by the one or more processors, a road feature from said each search area and at least one approximate vector;
generating, by the one or more processors, a translation vector and a confidence ratio from the detected road feature, wherein generating the translation vector comprises calculating the translation vector in accordance with:

$$\text{cost}(r, \alpha) = \sum_{i=1}^{I} \sum_{j=1}^{J_i} W_{i,j}(L_{i,j} - r\cos(\alpha - \theta_i))^2$$

wherein (r,α) represents the translation vector of length equal to r and direction equal to α, cost(r,α) represents a target cost function, $W_{i,j}$ represents a signal weight of the $j^{th}$ vector of direction equal to $\theta_i$, $L_{i,j}$ represents a location of the $j^{th}$ vector of direction equal to $\theta_i$, I represents a total number of different directions identified within said each directional chunk, $J_i$ represents a total number of possible road feature locations identified for direction $\theta_i$, and i and j represent summation indices; and
aligning by the one or more processors, the raster data for said each search area with the at least one approximate vector using the translation vector.

2. The method of claim 1, wherein defining the search areas comprises defining a rectangle having a length equal to at least a length of the at least one approximate vector, and a predefined width.

3. The method of claim 1, wherein generating the confidence ratio comprises calculating a weighted angle span and a normalized distance factor for the raster data and dividing the weighted angle span by the normalized distance factor.

4. The method of claim 3, wherein calculating the weighted angle span comprises calculating the weighted angle span in accordance with:

$$\psi = \frac{\max\{\|V_i \times V_j\| \mid i, j \in I\}}{\max\{\|V_i\|^2 \mid i \in I\}}$$

wherein ψ represents the weighted angle span, $V_i$ represents an aggregated road vector of direction equal to $\theta_i$, $V_j$ represents an aggregated road vector of direction equal to $\theta_j$, I represents the set of integer numbers, and i and j represent summation indices.

5. The method of claim 3, wherein calculating the normalized distance factor comprises calculating the normalized distance factor in accordance with:

$$\omega = \sqrt{\frac{\text{cost}(r_0, \alpha_0)}{\sum_{i,j} W_{i,j}}}$$

wherein ω represents the normalized distance factor, cost($r_0$,$\alpha_0$) represents the value of the target cost function for r equal to $r_0$ and a equal to $\alpha_0$.

6. The method of claim 1, wherein the raster data includes a satellite image.

7. The method of claim 6, wherein the set of approximate vectors of vector data includes approximate street vectors that approximate locations of streets present in the satellite image.

8. The method of claim 7, further comprising aligning the approximate street vectors with respective vectors that better approximate the locations of the streets present in the satellite image.

9. The computer readable storage medium of claim 8, wherein defining the search areas comprises defining a rectangle having a length equal to at least a length of the at least one approximate vector, and a predefined width.

10. A non-transitory computer readable storage medium having instructions stored thereon that, when executed by a processor, cause the processor to perform a method, the method comprising:
receiving raster data and a set of approximate vectors of vector data associated with features within the raster data;
identifying directions of the approximate vectors and grouping the approximate vectors into one or more directional chunks based on their directions;
defining search areas of the raster data for each directional chunk of the one or more directional chunks, each search area of the search areas encompassing at least one approximate vector of the set of approximate vectors;
detecting a road feature from said each search area and at least one approximate vector;
generating a translation vector and a confidence ratio from the detected road feature, wherein generating the translation vector comprises calculating the translation vector in accordance with:

$$\text{cost}(r, \alpha) = \sum_{i=1}^{I} \sum_{j=1}^{J_i} W_{i,j}(L_{i,j} - r\cos(\alpha - \theta_i))^2$$

wherein (r,α) represents the translation vector of length equal to r and direction equal to α, cost(r,α) represents a target cost function, $W_{i,j}$ represents a signal weight of the $j^{th}$ vector of direction equal to $\theta_i$, $L_{i,j}$ represents a location of the $j^{th}$ vector of direction equal to $\theta_i$, I represents a total number of different directions identified within said each directional chunk $J_i$ represents a total number of possible road feature locations identified for direction $\theta_i$, and i and j represent summation indices; and
aligning the raster data for said each search area with the at least one approximate vector using the translation vector.

11. The computer readable storage medium of claim 10, wherein generating a confidence ratio comprises calculating a weighted angle span and a normalized distance factor for the raster data and dividing the weighted angle span by the normalized distance factor.

12. The computer readable storage medium of claim 11, wherein calculating the weighted angle span comprises calculating the weighted angle span in accordance with:

$$\psi = \frac{\max\{\|V_i \times V_j\| \mid i, j \in I\}}{\max\{\|V_i\|^2 \mid i \in I\}}$$

wherein $\psi$ represents the weighted angle span, $V_i$ represents an aggregated road vector of direction equal to $\theta_i$, $V_j$ represents an aggregated road vector of direction equal to $\theta_j$, I represents the set of integer numbers, and i and j represent summation indices.

13. The computer readable storage medium of claim 11, wherein calculating the normalized distance factor comprises calculating the normalized distance factor in accordance with:

$$\omega = \sqrt{\frac{\text{cost}(r_0, \alpha_0)}{\sum_{i,j} W_{i,j}}}$$

wherein $\omega$ represents the normalized distance factor, cost $(r_0, \alpha_0)$ represents the value of the target cost function for r equal to $r_0$ and a equal to $\alpha_0$.

14. The computer readable storage medium of claim 10, wherein the raster data includes a satellite image.

15. The computer readable storage medium of claim 14, wherein the set of approximate vectors of vector data includes approximate street vectors that approximate locations of streets present in the satellite image.

16. The computer readable storage medium of claim 15, wherein the method further comprises aligning the approximate street vectors with respective vectors that better approximate the locations of the streets present in the satellite image.

\* \* \* \* \*

UNITED STATES PATENT AND TRADEMARK OFFICE
CERTIFICATE OF CORRECTION

PATENT NO.           : 8,805,118 B2                                         Page 1 of 1
APPLICATION NO.      : 13/426284
DATED                : August 12, 2014
INVENTOR(S)          : Wu It is certified that error appears in the above-identified patent and that said Letters Patent is hereby corrected as shown below:

Claims
Column 14, Line 13, claim 5, after word "and", please delete "a" and insert --α--.
Column 14, Line 59, claim 10, after word "chunk", please insert --,--.
Column 16, Line 9, claim 13, after word "and", please delete "a" and insert --α--.

Signed and Sealed this
Fifth Day of July, 2016

Michelle K. Lee
*Director of the United States Patent and Trademark Office*